Figure 1:
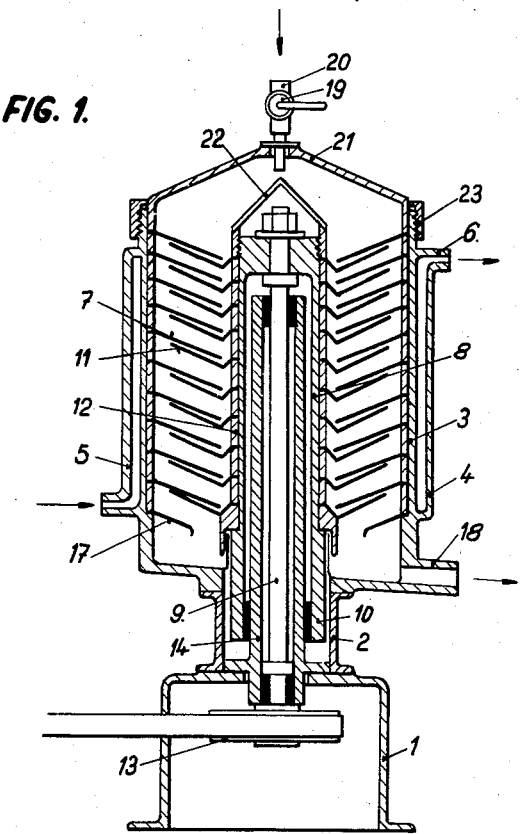

June 24, 1958   A. MASEK ET AL   2,840,460
METHOD FOR CONTINUOUS PRODUCTION OF BUTTER
Filed Dec. 10, 1954

INVENTORS
Antonin Mašek, Zdeněk Malík
BY
Richard Low agt

United States Patent Office 2,840,460
Patented June 24, 1958

2,840,460
METHOD FOR CONTINUOUS PRODUCTION OF BUTTER

Antonín Mašek and Zdeněk Malík, Prague, Czechoslovakia, assignors to VSCHP, Vyzkummy ustav stroju chaladichich a potravinarskych, Prague, Czechoslovakia Application December 10, 1954, Serial No. 474,414

Claims priority, application Czechoslovakia December 14, 1953

2 Claims. (Cl. 31—89)

The present invention relates to improvements in a method for continuous production of butter.

One object of the invention is to provide a method for continuous production of butter of highest quality, containing a small proportion only of non-fat substances.

A further object of the invention is to provide a method for the production of butter in a continuous way from sweet as well as from sour cream of a high nutritional value.

With these and other objects in view the new method consists in that the cream is uniformly spread in thin layers over two systems of surfaces alternating with, and performing relative movements towards, each other, the cream flowing under the influence of gravity or pressure over the surfaces of one system to the surfaces of the other system wherefrom it is projected by centrifugal force under incessant impacts to following surfaces of the first system and so on under permanent change of the direction of flow on its movement from one surface to the other, the velocity of passage of the cream in the spaces between the surfaces being changed, if necessary. The size of the contact area of the cream with the air may be adjusted as required.

On the surfaces where the cream comes into contact with the air a great number of small air bubbles, dispersed in the cream plasma, is produced. Fat-globules gather on said air bubbles and are united during the further process into lumps of butter fat, from which small butter granules are produced in the final phases of the process.

The butter granules are separated from the buttermilk to a rather high degree, which fact renders the churning process economical. Considering that the plurality of albuminous components of the cream has ample time to pass into the butter-milk during the relatively slow phases of the churning process, the amount of non-fat components in the butter is considerably reduced as compared with the known processes for continuous production of butter.

A number of factors accelerates the formation of butter-granules and has an advantageous influence upon their physical properties and micro-structure. These factors may be summed up as follows: The continuous and gradual churning process proceeds at a slow rate and may be easily controlled by determining the size of the contact area of the cream with the air. All these factors, in addition to the advantageous effects mentioned above, improve the quality of the butter and permit the churning both of fresh cream which has just been pasteurised as well as of physically and biologically mature cream of higher viscosity.

The accompanying drawing represents by way of example an embodiment of the apparatus for carrying out the method according to the present invention.

Figure 2:
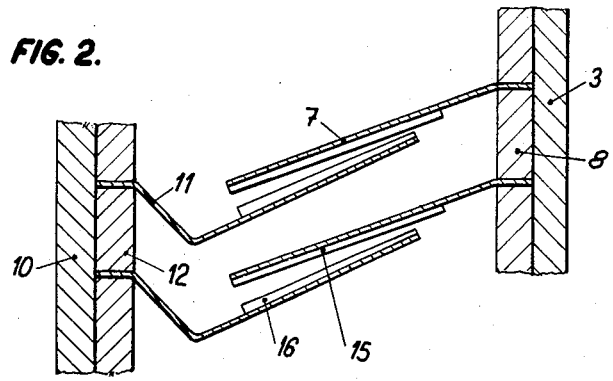

Fig. 1 shows the apparatus in a vertical section; and
Fig. 2 shows a cross section of details on a larger scale.

A vertical hollow cylinder or drum 3 is mounted on a socket 2 of the frame 1 of the machine. The cylinder is provided with a jacket 4 serving for the passage of a cooling medium. In the modification shown, the cooling medium is supplied countercurrent to the flow of cream through the tube 5 at the lower end and withdrawn at the upper end of the jacket through a tube 6.

Removable circular rings 7 are secured to the inner walls of the cylinder 3 between spacers 8 or by means of screws (not shown). The number of rings as well as their spacing from each other may be changed as required. A sleeve 10 is mounted in the axis of the cylinder 3 on a shaft 9, said sleeve carrying a system of discs 11. The spacing of the discs 11 as well as their number may be adjusted as required by means of spacing rings 12 or screw-bolts (not shown). The shaft 9 with the discs 11 represents the rotor of the apparatus and is driven by means of a pulley 13 or directly by a motor or over a clutch and gear-box for the change of rotation of the rotor.

The sleeve 10 with the discs 11 is mounted for displacement in axial direction along a tubular member 14. The spacing between the discs 11 and rings 7 may thus be adjusted according to requirements. The axial displacement of the rotor can be carried out also during the operation of the machine.

The stationary rings 7 are provided at their lower side with churning vanes 15, the revolving discs 11 carry at their upper side similar vanes 16. The vanes may be provided in any shape, dimension and number and may extend in radial or tangential direction. They may be given an inclining position as well.

The clear width of the spaces between the operative cells, i. e. rings 7 and discs 11, increases in downward direction, i. e. it is smallest between the top-cells and largest between the lower ones, and the cells may have an increasing number of churning vanes in the downward direction.

The lowest ring 17 serves as a collecting ring for the mass under treatment and a draining channel 18 extends from the bottom of the cylinder 3, said channel 18 being connected to an apparatus for further treatment of the butter.

The cream is supplied to the upper part of the cylinder 3 from a container (not shown) through a tubing 20 provided with a control-valve 19 and opening into a cover 21. The top of the rotor is provided with a conical cap 22, the apex of which being located opposite the inlet tube 20.

The container is preferably provided with a device securing a uniform supply of the cream under constant pressure, for instance with a float-gage control device or the like.

The cover 21 is secured to the cylinder for instance by means of a threaded sleeve 23, bayonet closure or in any other way.

An oil chamber may be provided in the interior of the socket 2 for the purpose of lubricating the bearings of the shaft 9.

The apparatus just described operates as follows:

The cream supplied through the tube 20 is spread by the cap 22 in a thin and uniform layer over the upper surface of the first stationary ring 7 and flows from the latter by gravity to the upper surface of the first revolving disc 11, from which it is thrown by centrifugal force into the first operative member (ring-disc). From here the cream proceeds to the upper surface of the second revolving ring etc., so that the direction of flow of the cream as well as its velocity is continuously changed (in exact periods of time) under incessant impacts imparted by the churning vanes 15, 16. In the upper working members the cream is beaten to a foam, in the central working members lumps of butter fat and in the lower working members butter granules are produced. The butter-milk with the butter granules proceed from the collecting disc 17 to the bottom of the cylinder 3 and through the channel 18 to a device in which butter-milk is separated from the butter granules. The butter granules are then conveyed to a washing machine, where there they are subjected to a double washing action, and proceed further to a kneading machine with mixing chambers from which a continuous stream of butter passes to the molding and packing machines.

The device for separating the butter granules from the butter-milk, the washing and kneading machines as well as the necessary conveyors are known per se and may be located on the base or frame 1 of the machine, or otherwise.

It has been found, that a certain control of the temperatures under which the churning process takes place in the individual phases of operation renders the process more economical and improves the quality of the produced butter. The temperature of the cream which rises during the churning operation is controlled by cooling the cylinder 3 by means of the cooling medium flowing through the jacket 4.

We claim:

1. A method of producing butter from cream, comprising continuously introducing cream to the upper portion of a churning zone, passing the cream in form of a thin layer through a downwardly directed, substantially vertical and cylindrical zigzag-like course forming said zone, the zigzag course being constituted by outwardly and inwardly directed turns, the outward turns alternating with the inward turns, the outward turns being directed toward the outer surface of the cylindrical course, the inward being directed toward the axis of the cylindrical course, subjecting the cream to actions of centrifugal and agitating forces, while moving along the outward turns, thus making the cream move with relatively high velocity and with agitation along the outward turns, forcing the cream, while moving along each of the outward turns through a space of gradually decreasing height, causing the cream to move under the influence of gravity, that is, at low velocity, and without being agitated along the inward turns, and continuously withdrawing butter and buttermilk from the churning zone.

2. In the method according to claim 1, causing the cream, while moving along the inward turns, to pass through spaces which, individually, increase in height in a downward direction.

References Cited in the file of this patent
UNITED STATES PATENTS

| | | |
|---|---|---|
| 847,697 | Risberg | Mar. 19, 1907 |
| 938,815 | Borgstorm | Nov. 2, 1909 |
| 2,334,919 | Godfrey | Nov. 23, 1943 |
| 2,564,715 | North | Aug. 21, 1951 |
| 2,617,732 | Thorstensson-Rydberg | Nov. 11, 1952 |
| 2,688,468 | Thorstensson-Rydberg | Sept. 7, 1954 |